Oct. 7, 1969  D. McL. MOULTON ETAL  3,471,335
METHOD OF OPERATING A FUEL CELL USING PEROXIDE
OXIDANT FORMED IN SITU
Original Filed June 22, 1964
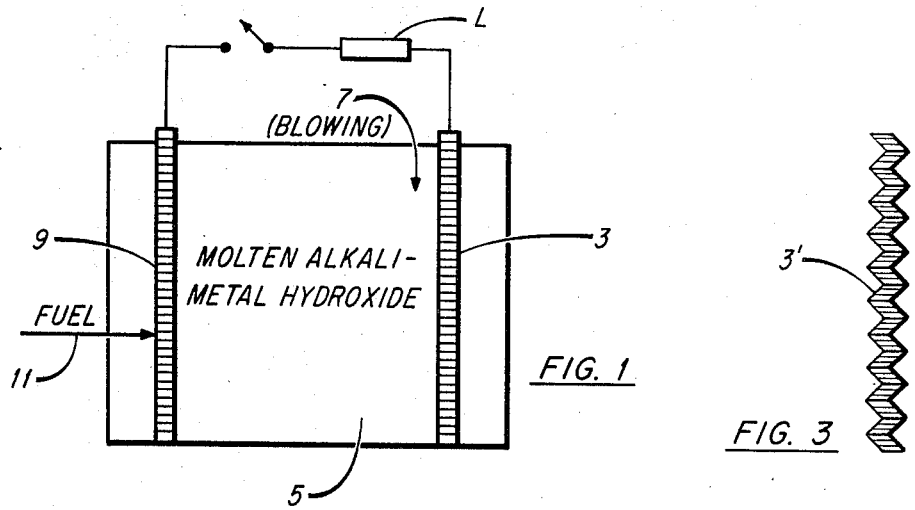
FIG. 1
FIG. 3
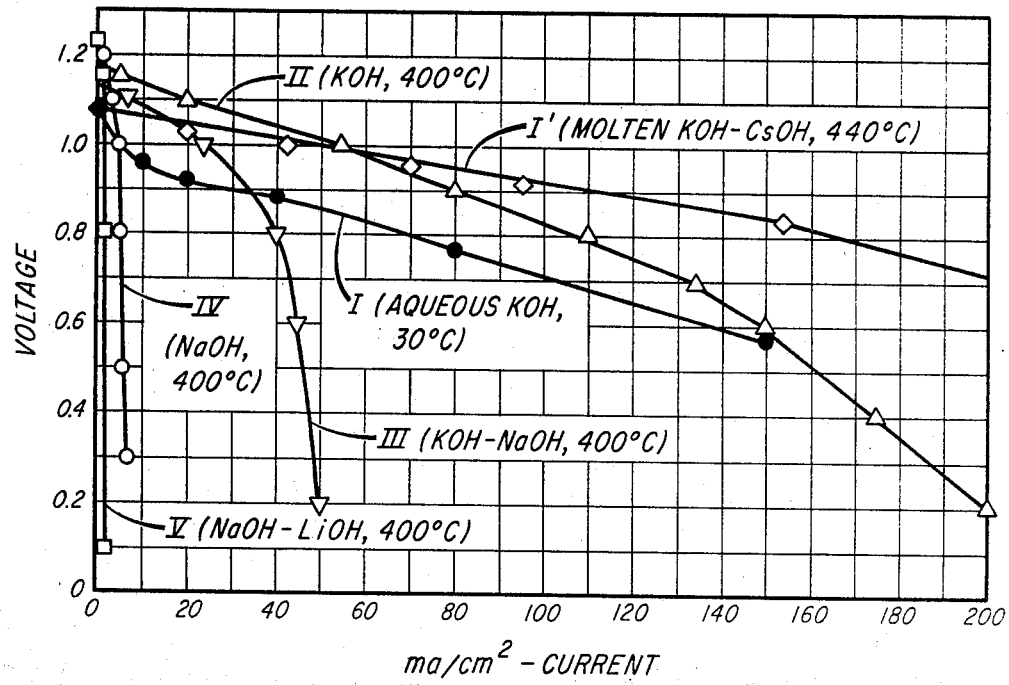
FIG. 2
DAVID McL. MOULTON
ROBERT L. NOVACK
WALTER JUDA, INVENTORS
BY Rines and Rines
ATTORNEYS

United States Patent Office 3,471,335
Patented Oct. 7, 1969

3,471,335
METHOD OF OPERATING A FUEL CELL USING PEROXIDE OXIDANT FORMED IN SITU
David McL. Moulton, Scituate, Robert L. Novack, Arlington, and Walter Juda, Lexington, Mass., assignors to Prototech Incorporated, Cambridge, Mass., a corporation of Massachusetts
Continuation of application Ser. No. 376,916, June 22, 1964. This application Oct. 23, 1967, Ser. No. 677,478
Int. Cl. H01m 27/20
U.S. Cl. 136—86                                4 Claims

ABSTRACT OF THE DISCLOSURE

This disclosure deals with a novel fuel cell apparatus and method in accordance with which substantially anhydrous alkali metal hydroxide electrolytic media are employed that in contact with air produce peroxides and superoxides that are employed as the electrochemical oxidant in the fuel cell, with techniques for insuring adequate supply of the oxidant to the cathode through agitation in its vicinity.

---

This application is a continuation of application Ser. No. 376,916, filed June 22, 1964, now abandoned.

The present invention relates to fuel cell apparatus and methods of operating the same, being more specifically directed to intermediate temperature fuel cells (operated in a temperature range of from about 300° C. to about 500° C., more or less) embodying alkali metal hydroxide molten electrolytic media.

Fuel cells and similar apparatus have previously been successfully operated with relatively low temperature aqueous alkali metal hydroxide media with the aid of catalyzed porous cathode electrodes through which an oxidant has been introduced into the cell. Not only have such cells required the embodiment of relatively expensive porous catalyzed electrode structures, which may become flooded, but their operation has been subject to the characteristic polarization effects previously considered inherent in fuel cells of this character; that is, a voltage vs. current discharge curve that initially steeply drops as a result of initial decrease in activity of either the fuel or the oxidant at the respective electrodes, following the initial drain of current from the cell. Such characteristic discharge polarization curves have heretofore been considered unavoidable and have resulted in limitations upon the efficiency of fuel utilization.

Attempts to operate such cells in higher temperature regions where the alkali metal hydroxide electrolyte became molten have heretofore led to a variance in the electrolytic medium resulting from a substantially complete oxidation phenomenon in which the use of carbon anodes led to the formation of carbonate ions as a product. Similar problems may occur where carbonaceous fuels are employed; so that the use of molten alkali electrolytic media at intermediate temperatures has not, heretofore, been considered practically feasible.

In accordance with the discovery underlying the present invention, however, it has been found that, through appropriate operation of alkali metal hydroxide electrolytic media in cells involving metal electrodes and above a relatively critical temperature, a new type of discharge-curve phenomenon is achieved that is not subject to the polarization characteristics of the conventional current-discharge curves; that, surprisingly, does not require the use of either catalytic cathode electrodes or porous electrodes; and that provides very high power densities.

An object of the invention, accordingly, is to provide a new and improved fuel cell apparatus and the like of the above-described character that enables the employment of molten electrolytic media containing alkali metal hydroxides.

A further object is to provide a new and improved method of operating such a fuel cell apparatus and the like.

Other and further objects will be explained hereinafter and will be more particularly pointed out in connection with the appended claims.

The invention will now be described in connection with the accompanying drawing, FIG. 1 of which is a schematic diagram illustrating a fuel cell constructed in accordance with the preferred embodiment of the invention;

FIG. 2 is a graph contrasting the novel results attainable in accordance with the present invention with prior-art cells; and FIG. 3 is a side elevation of a suitable modified cathode.

Underlying the present invention is the discovery that, if the alkali metal hydroxide can be elevated to a temperature sufficient to convert a substantial amount of the hydroxide to peroxide and/or superoxide while rendering the electrolytic medium molten in a manner such as to reduce the partial pressure of water in the electrolyte into substantial equilibrium with the partial pressure of water in the atmosphere, such as air, surrounding the medium (i.e., to render the medium substantially anhydrous), the novel results above-described are attained. The mechanism involved appears to be the following, though the invention is not to be limited or dependent upon the accuracy of any given theory or hypothesis, it having been proven to operate to produce the claimed results.

Oxygen from the air atmosphere contacting the electrolytic medium of the cell displaces the water bound in the melt as hydroxyl ions, under the appropriate temperature conditions, leading to the formation of alkaline metal peroxide or superoxide, which serves the function in the region of the cathode as substantially the sole fuel cell electrochemical oxidant, as distinguished from prior-art cells of the above-described character wherein oxidant from an external source is introduced through the porous catalyzed cathode electrode as a gas. This phenomenon has resulted in the elimination of the need for the conventional three-phase interface, provided by the porous catalytic electrode, the electrolyte, and the oxidant gas. It has thus been discovered that ordinary base metals that are non-catalytic, such as nickel, cobalt, and iron, to mention but three, may successfully be employed as cathodes in the cells of the present invention, without the necessity for catalysts. More than this, since the oxidant supply occurs within the electrolytic medium, it has been discovered that the cathode may be entirely non-porous and impermeable, enabling the use of very low-cost structures, as distinguished from the above-mentioned prior-art cell structures.

Thus, referring to FIG. 1, a preferably impermeable non-porous cathode 3, as of nickel, is shown immersed in a molten alkali metal hydroxide electrolytic medium 5, such as KOH, that contacts an air atmosphere at 7, for the purposes above mentioned. A Ag-Pd or other appropriate anode electrode 9 may also be immersed in or contacted with the molten electrolytic medium 5, with fuels, such as hydrogen, introduced therethrough, as schematically represented by the arrow 11. The output circuit embodying a load, schematically illustrated at L, is connectable between the anode 9 and cathode 3 in conventional fashion to permit the withdrawal of current.

Were the KOH electrolytic medium 5 in the aqueous state, with the cell operating, for example, at or near room temperature or thereabove, within limits later defined, and assuming for the moment that there were some way to introduce oxidant through the cathode 3 into the electrolytic medium 5, the conventional characteristic discharge curve I of FIG. 2 would be produced, starting off with the voltage rapidly dropping at the left-hand portion thereof due to the polarization effects previously discussed.

If, however, the KOH medium 5 is rendered molten by elevation to a temperature at least and preferably in excess of substantially 300° C., and is there-maintained to reduce the partial pressure of water in the medium 5, into substantial equilibrium with the partial pressure of water in the atmosphere 7, contacting the medium 5, the entirely different and inverted type of discharge curve II is produced which is void of the drop caused by polarization in the conventional curve I. In this connection, the cathode 3 may, as before mentioned, be completely solid and impervious and may even be constructed of a non-catalytic base metal.

As a first example, the actual characteristic curve II of FIG. 2 was obtained with a KOH electrolytic medium 5 maintained at approximately 400° C., a solid impervious nickel cathode 3 in the form of a rectangular sheet, 1 cm.$^2$ and about .005″ thick, and an anode 9 of Ag-Pd tubing 0.062″ outer diameter (3 mil wall) into which hydrogen was fed as fuel. The KOH electrolytic medium 5 also contained a few mol percent of sodium hydroxide for the purpose of lowering the melting point.

As a second example, curves very close to that reported at II were obtained with each of a gold cathode electrode 3 and a catalytic platinum cathode 3 of the same shape. Cobalt and iron impervious cathodes were also successfully operated in these cells.

It was further discovered to be preferable to effect a stirring action that aided the continuous consistent operation of the cell, as by mechanical relative agitation of the cathode and the medium there-adjacent by any desired mechanically vibratory or other means. Other stirring mechanisms include vibration of the cathode electrode or shaking of the electrolytic medium 5 itself in other ways. This stirring or agitation insures the application to the cathode surface of fresh peroxide or superoxide on a continual basis. A convenient stirring or agitating technique was found to reside in the blowing of air, as at 7, in the region of the medium 5 near the cathode 3. For a given voltage, two-to-three times the output current was produced by such agitation, and the range of high current density with decreasing voltage was extended. Current densities in excess of 400 amperes per square foot at low voltages of the order of 0.70 volt have been thus produced.

It was thus unexpected that the introduction of air at 7 should have produced higher current densities and considerably larger ranges of decreasing voltage than the oxygen oxidant itself for the same oxygen flow or consumption. The reason appears to be that the air flow improves the rate of flow of the oxidant in the medium toward the cathode, the other gases accompanying the air flow at 7 also adding stirring action.

By increasing the effective surface area of the nickel or other cathode 3 without changing the perimetric dimensions of the cathode, as by corrugating the same at 3′, FIG. 3, a further apparent increase in current density was attained: for example, current densities of about 2:1 were obtained with sufficient corrugations to double the contact area of the cathodes in cells of the above-described character. It appears, moreover, that the distance between corrugations or other discontinuities in the cathode surface should be of the order of the diffusion layer dimensions or greater to have any substantial effect; that is, for example, of the order of about 1 mm. in the case of cells as above described.

When lighter alkali metal hydroxides were used in substantial proportion, the same inverted type of characteristic discharge curve shown at II was also found to exist, without initial polarization drop, but of much less limiting current. Thus, curve III drops off for lower values of current, and curves IV and V drop off for still smaller currents.

Curve III was obtained for equal mol percentages KOH and NaOH at the same substantially 400° C. and with the same nickel and Ag-Pd electrodes above-discussed. Curves IV and V, however, were obtained under precisely the same conditions, respectively for a substantially complete NaOH medium 5 and a half-and-half NaOH and LiOH electrolytic medium 5, respectively; demonstrating the decided preference in the utilization of heavier alkali metal hydroxides.

Rubidium and cesium are even heavier alkali metals that may be used if cost is not an important object. Thus, in curve I′, the highest current densities over the largest voltage was attained, again with a nickel cathode, Ag-Pd anode, and a 11 mol percent CsOH electrolyte added to KOH and maintained molten at about 440° C.

The significance of the utilization of the heavier alkali metals is evident when it is considered that, for example, a 0.9 v. voltage gives rise to 80 ma./cm.$^2$ with KOH, but only 36 ma./cm.$^2$ if half of the medium involves the lighter alkali metal sodium. Stated otherwise, as the concentration of the heavier alkali metal hydroxides is increased, the available power density increases.

The cells of the present invention, it is to be understood, may either be operated with cathode region agitation for the improved results before mentioned, or they may be operated without agitation as so-called "air-breathing" cells for the purpose of reducing heat loss to the air or other gases passing through the electrolyte and also reducing somewhat the nickel or other cathode metal consumption. If, of course, porous cathodes are desired, they may be employed through the advantages of impervious cathodes of the type above mentioned are clear.

The preferred peroxides and superoxides may also be utilized in electrolytes, such as molten anhydrous alkali-metal carbonates (preferably in the 400–600° C. range), and alkali-metal fluorides and the like, under substantially the same conditions above-specified. In all cases, the preferred means for maintaining the peroxide or superoxide is a stream of oxygen or air introduced, as at 7, through the melt, as before described.

Further modifications will occur to those skilled in the art and all such are considered to fall within the spirit and scope of the invention as defined in the appended claims.

What is claimed is:

1. A method of operating a fuel cell containing an alkali-metal hydroxide electrolytic medium, that comprises maintaining the medium at a temperature of at least substantially 300° C. and sufficient to render the medium molten and substantially anhydrous and in contact with an oxygen-containing atmosphere in an amount sufficient to provide in the medium at least one of alkali-metal peroxide and superoxide, said peroxide and superoxide functioning as substantially the sole fuel cell electrochemical oxidant, applying hydrogen-containing fuel to the fuel cell, and drawing current therefrom while holding the said medium at such temperature and while utilizing said oxidant electrochemically to provide substantially the entire current output of the fuel cell.

2. A method as claimed in claim 1, further comprising agitating said medium to facilitate the electrochemical utilization of said oxidant.

3. A method as claimed in claim 1, further comprising introducing an oxygen-containing gas into said medium.

4. A method as claimed in claim 1, wherein said medium is disposed between an anode and a cathode in a housing, and further comprising feeding an oxygen-containing gas into said medium within the housing along a path other than through the cathode.

References Cited

UNITED STATES PATENTS

| | | | |
|---|---|---|---|
| 3,280,014 | 10/1966 | Kordesch et al. | 136—86 X |
| 353,141 | 11/1886 | Kendall | 136—86 |
| 555,511 | 3/1896 | Jacques | 136—84 |
| 3,215,562 | 11/1965 | Hindin | 136—86 |
| 3,350,226 | 10/1967 | Lieb et al. | 136—86 |

FOREIGN PATENTS

| | | |
|---|---|---|
| 1,670 | 1903 | Great Britain. |
| 233,847 | 5/1961 | Australia. |

OTHER REFERENCES

G. J. Young: Fuel Cells, Reinhold Publishing Corp., New York, 1960, pp. 11, 14, 30 and 49 relied upon.

ALLEN B. CURTIS, Primary Examiner